stance, as the possibility of using high pressures makes it possible to use higher temperatures than would otherwise be feasible, as the increase of pressure naturally raises the boiling point and permits the reaction to be carried out at higher temperature without ebullition and without vaporizing the aldehyde. Under these conditions, oxygen may be completely absorbed from air, leaving only nitrogen mixed with aldehyde and acetic acid vapor. It has been stated in former patents, and much emphasis laid on the statement, that the production of acetic acid proceeds much more readily in the presence of an excess of acetic acid, and in some instances, an initial charge of acetic acid was provided in the reaction vessel. I have found that the presence of acetic acid is not essential to a satisfactory reaction, as the production of acid proceeds according to this invention as rapidly in pure acetaldehyde as in a mixture of aldehyde and acetic acid.

UNITED STATES PATENT OFFICE.

HOWARD W. MATHESON, OF SHAWINIGAN FALLS, QUEBEC, CANADA.

MANUFACTURE OF ACETIC ACID. REISSUED

1,410,207.   Specification of Letters Patent.   Patented Mar. 21, 1922.

No Drawing.   Application filed November 26, 1917.   Serial No. 203,972.

*To all whom it may concern:*

Be it known that I, HOWARD W. MATHESON, a subject of the King of Great Britain, and resident of Shawinigan Falls, in the Province of Quebec and Dominion of Canada, have invented certain new and useful Improvements in the Manufacture of Acetic Acid, of which the following is a full, clear, and exact description.

This invention relates to improvements in manufacture of acetic acid, and the object of the invention is to provide for commercial manufacture of acetic acid at a high rate of speed and low cost.

A number of methods of producing acetic acid synthetically have been discussed in recent years. These methods naturally resolve around a method of combining oxygen with acetaldehyde and various processes have been proposed for carrying out this combination. As laboratory experiments, these proposed processes are quite simple, but from a commercial point of view, they are for the most part impracticable, for various reasons, such as the high cost of catalysts used, the high cost of preparing pure oxygen, the small production of acid, or the difficulties of purifying the acid, and the danger of serious explosion due to the use of pure oxygen. From a commercial point of view, the acid must be produced fairly pure and readily purifiable; the time of reaction must be reasonably short; the catalyst used must be inexpensive; and the whole process must be capable of being carried out on a large scale in commercially practicable apparatus. It is obvious that many operations may be carried on under laboratory conditions and with laboratory apparatus, which are utterly impracticable or impossible on a commercial scale, owing to the cost of materials and the very great difference in the possibilities of small laboratory apparatus and large commercial apparatus. The present invention aims to produce acetic acid in commercial quantities in a high state of concentration and purity, using inexpensive materials and comparatively inexpensive and commercially practicable apparatus. It has been found that the rate of combination of oxygen and aldehyde can be very greatly increased if the reaction is carried out under considerable pressure, and furthermore, that the reaction proceeds more rapidly and effectively at high temperatures. This is a fortunate circumstance, as the possibility of using high pressures makes it possible to use higher temperatures than would otherwise be feasible, as the increase of pressure naturally raises the boiling point and permits the reaction to be carried out at higher temperature without ebullition and without vaporizing the aldehyde. Under these conditions, oxygen may be completely absorbed from air, leaving only nitrogen mixed with aldehyde and acetic acid vapor. It has been stated in former patents, and much emphasis laid on the statement, that the production of acetic acid proceeds much more readily in the presence of an excess of acetic acid, and in some instances, an initial charge of acetic acid was provided in the reaction vessel. I have found that the presence of acetic acid is not essential to a satisfactory reaction, as the production of acid proceeds according to this invention as rapidly in pure acetaldehyde as in a mixture of aldehyde and acetic acid.

The invention consists briefly in passing air through acetaldehyde under pressure up to 120 pounds per square inch in the presence of a suitable catalyst, and maintaining the temperature at the degree of greatest efficiency for the pressure used, that is, between 20° and 75° C. The vapors which form in the kettle are condensed under the same pressure as obtains in the kettle, and the yield of the condensers, which is weak acetic acid and aldehyde, is returned to the reaction. Gases escaping from the condensers are scrubbed to remove aldehyde. When the reaction is complete, the acetic acid is distilled to remove impurities.

In greater detail, the process is as follows:—A kettle having a lining, which is impervious to the action of both aldehyde and acetic acid, such as aluminum, is provided with a series of coils, through which water or steam may be passed to regulate the temperature of the reaction. An air pipe is provided extending to the bottom of the kettle, where it is arranged in spiral form, the spiral being provided with a multitude of small openings from which the air may emerge, so as to pass through the whole volume of the reaction liquid. The air is thus distributed through the liquid in the best manner for rapid absorption of the oxygen therefrom, and it furthermore serves to keep the catalyst in suspension until the same is dissolved. The kettle is charged with a thousand gallons of aldehyde and about .5% of any suitable substance which will act as a catalyst. Steam or warm water is now passed through the coils to raise the temperature of the aldehyde rapidly to a point where it will react with the oxygen of the air, namely, 20° to 25° centigrade. Air is now passed in through the air pipe at a rate up to about three hundred cubic feet per minute, and the air bubbles up through the entire mass of the aldehyde. The aldehyde absorbs oxygen from the air and is thus converted into acetic acid. This action is accompanied by great liberation of heat, which is absorbed by water passed at a suitable rate through the coils to keep the temperature to the desired degree. When the reaction commences, the pressure is allowed to rise slowly to about seventy-five pounds per square inch, and the temperature is also allowed to rise slowly to about 65° C.

Under these conditions, the oxygen of the air is entirely absorbed, and the aldehyde converted into acetic acid, thus leaving nitrogen, and possibly a small amount of carbon dioxide, in the reaction vessel. The nitrogen is allowed to escape. As the escaping nitrogen entrains a considerable amount of acetic vapor and aldehyde, it is passed through suitable condensing apparatus maintained at the same pressure as the reaction vessel, where the acetic acid and aldehyde are condensed, and from which they are returned to the reaction vessel. This condensing apparatus preferably takes the form of a water condenser maintained at a temperature of 1 to 5° C., into which the vapors first flow, and a brine condenser kept at a temperature of −10° to −15° C., into which the vapors escaping from the water condenser pass. The greater part of the acetic acid vapors are condensed in the water condenser and the greater part of the aldehyde in the brine condenser. The condensation product obtained from each condenser is returned to the reaction vessel through U seals. Vapors not condensed escape through a relief valve set according to the pressure under which the reaction is carried out to a scrubber, which is kept at a pressure of say twenty pounds to the square inch. The scrubber is supplied with ice cold water and serves to remove uncondensed aldehyde from the nitrogen, which is allowed to escape to the atmosphere. The operation of the scrubber is not essential to the carrying out of the process, except from an economic point of view. It has been found that from 6% to 8% of the original amount of aldehyde may be recovered in the scrubber, which when suitably rectified can be used again.

At the end of from eight to eighteen hours, the reaction is complete, and the kettle contains crude acetic acid of 95% concentration, or over, together with the dissolved catalyst. The contents of the kettle are discharged into storage tanks and refined in stills; the distilled product being acetic acid of a very high grade of purity, averaging from 98% to 99.5% concentration. In appearance, it is a clear liquid of very pale straw color, or practically colorless, when drawn off from the reaction vessel. This invention not only produces acid of great purity, but also gives a very high yield. The yield averages from 88% to 95% of the theoretical amount.

While a number of substances may be used as catalysts, I have found manganese acetate to be suitable, both from the point of view of its action and from the point of view of its low cost.

One of the great advantages of this invention is that by utilizing both high temperature and high pressure, oxygen can be completely absorbed from the air, so that the gases passing from the reaction vessel contain no free oxygen, along with the nitrogen and aldehyde vapors. This is an essential feature, as it has been found that the presence of even a small percentage of oxygen with the aldehyde makes the mixture extremely sensitive to explosion. Another advantage is obviously the ability to use air instead of previously prepared oxygen. Still another advantage is the very large yield of practically pure, highly concentrated acid produced in short periods of time.

Having thus described my invention, what I claim is:—

1. A process for the manufacture of acetic acid which includes passing air into acetaldehyde containing a catalyst under pressure up to 120 pounds per square inch, and maintaining the temperature below the point of ebullition of the acetaldehyde at the pressure used.

2. A process for the manufacture of acetic acid which includes passing air into acetaldehyde containing a catalyst under pressure up to 120 pounds per square inch, maintaining the temperature below the boiling point of the aldehyde at the pressure used, and condensing the vapors arising from the reaction, the condensation being carried on under substantially the same pressure as the reaction.

3. A process for the manufacture of acetic acid which comprises passing air into acetaldehyde in presence of manganese acetate under pressure of from 20 pounds to 120 pounds per square inch, and maintaining the temperature between 25° C. and 75° C.

4. In a process for the manufacture of acetic acid by passing air into acetaldehyde in presence of a catalyst and under pressure, heating the aldehyde to the point of efficient combination with the oxygen of the air and when the reaction progresses sufficiently to generate heat in large quantities replacing the heating medium with a cooling medium to maintain the temperature of the reaction below the boiling point of the aldehyde at the pressure used.

5. A process according to claim 4, in which the aldehyde is first raised to a temperature of approximately 20° C. to 25° C. and during reaction the temperature maintained below 75° C. and the pressure below 120 pounds per square inch.

6. A process for the manufacture of acetic acid from acetaldehyde which comprises passing air into acetaldehyde containing a catalyst under pressure below 120 pounds per square inch, maintaining a temperature below the boiling point of the aldehyde at the pressure used, condensing the vapors arising from the reaction under substantially the same pressure as the reaction, and returning the condensate into the reaction until substantially no acetaldehyde remains in the reaction liquid.

7. A process for the manufacture of acetic acid which comprises passing air into acetaldehyde in presence of a catalyst under pressure and maintaining a temperature below the point of ebullition of the aldehyde at the pressure under which the process is carried out.

In witness whereof, I have hereunto set my hand.

HOWARD W. MATHESON.

Witnesses:
F. C. BUCKELL,
J. R. DONALD.